US012576535B2

(12) United States Patent
Park et al.

(10) Patent No.: US 12,576,535 B2
(45) Date of Patent: Mar. 17, 2026

(54) APPARATUS FOR AUTOMATICALLY FASTENING CHEMICAL COUPLER

(71) Applicant: SAMSUNG ELECTRONICS CO., LTD., Suwon-si (KR)

(72) Inventors: Shibaek Park, Suwon-si (KR); Han Sung Kim, Changwon-si (KR); Jooha Maeng, Suwon-si (KR); Youngsuk Park, Suwon-si (KR); Gi Seong Kim, Changwon-si (KR); Sung Hun Jeong, Changwon-si (KR)

(73) Assignees: Samsung Electronics Co., Ltd., Suwon-si (KR); Industry-Academic Cooperation Foundation of Kyungnain University, Changwon-si (KR)

( * ) Notice: Subject to any disclaimer, the term of this patent is extended or adjusted under 35 U.S.C. 154(b) by 235 days.

(21) Appl. No.: 18/361,553

(22) Filed: Jul. 28, 2023

(65) Prior Publication Data

US 2024/0066707 A1      Feb. 29, 2024

(30) Foreign Application Priority Data

Aug. 30, 2022     (KR) ........................ 10-2022-0109270

(51) Int. Cl.
B25J 9/16           (2006.01)
B25J 9/00           (2006.01)
         (Continued)

(52) U.S. Cl.
CPC ........... B25J 9/1697 (2013.01); B25J 9/0009 (2013.01); B25J 9/06 (2013.01); B25J 13/089 (2013.01);
         (Continued)

(58) Field of Classification Search
CPC . B25J 9/0009; B25J 9/06; B25J 9/1697; B25J 13/089; B25J 15/0028; B25J 19/021; B25J 19/023
See application file for complete search history.

(56) References Cited

U.S. PATENT DOCUMENTS

2020/0238507 A1*   7/2020   Naitou ..................... B25J 18/04
2022/0228689 A1*   7/2022   Song ..................... F16L 3/1075
                (Continued)

FOREIGN PATENT DOCUMENTS

KR            101572537 B1    11/2015
KR        20170058059 A      5/2017
                (Continued)

OTHER PUBLICATIONS

Kim, Han Sung , "Design of a 6-axis Compliance Device with F/T Sensing for Position/Force Control", Journal of The Korean Society of Industry Convergence, 21(2), 2018, 63-70.

*Primary Examiner* — Dale Moyer
(74) *Attorney, Agent, or Firm* — Wolf, Greenfield & Sacks, P.C.

(57) ABSTRACT

An apparatus for automatically fastening a chemical coupler to a connector of an automatic clean quick coupler (ACQC) system, includes a main body, a multi-degree of freedom (DOF) robot arm on the main body, a gripper on the multi-DOF robot arm that is configured to grip the chemical coupler, a vision sensor on the multi-DOF robot arm, and a controller connected to the gripper, the multi-DOF robot arm, and the vision sensor. The controller uses information about an environment surrounding the multi-DOF robot arm acquired by the vision sensor, to control an operation of the multi-DOF robot arm and an operation of the gripper.

18 Claims, 9 Drawing Sheets

(51) Int. Cl.

| | | |
|---|---|---|
| *B25J 9/06* | (2006.01) | |
| *B25J 13/08* | (2006.01) | |
| *B25J 15/00* | (2006.01) | |
| *B25J 19/02* | (2006.01) | |

(52) U.S. Cl.
CPC ......... *B25J 15/0028* (2013.01); *B25J 19/021* (2013.01); *B25J 19/023* (2013.01)

(56) References Cited

U.S. PATENT DOCUMENTS

| | | | |
|---|---|---|---|
| 2022/0380190 A1* | 12/2022 | Imai .......................... | F16J 13/02 |
| 2023/0030810 A1* | 2/2023 | Imai .......................... | F16J 13/24 |
| 2023/0278796 A1* | 9/2023 | Choi .................... | B65G 1/1373 |
| 2023/0294644 A1* | 9/2023 | Del Gizzi ................ | B64F 1/28 |
| 2023/0373103 A1* | 11/2023 | Littfin ..................... | B25J 15/02 |
| 2024/0058960 A1* | 2/2024 | Verma ..................... | B25J 18/04 |

FOREIGN PATENT DOCUMENTS

| | | | |
|---|---|---|---|
| KR | 20170142412 | A | 12/2017 |
| KR | 101876676 | B1 | 7/2018 |
| KR | 102029634 | B1 | 10/2019 |
| KR | 102201188 | B1 | 1/2021 |
| KR | 102218027 | B1 | 2/2021 |
| KR | 102218352 | B1 | 2/2021 |
| KR | 102295510 | B1 | 8/2021 |
| KR | 102297463 | B1 | 9/2021 |
| KR | 102354643 | B1 | 1/2022 |

* cited by examiner

130

132
132a
134a
134

130

132
132a
134a
134

430

430

APPARATUS FOR AUTOMATICALLY FASTENING CHEMICAL COUPLER

CROSS-REFERENCE TO RELATED APPLICATION(S)

This application claims priority under 35 U.S.C. § 119 to Korean Patent Application No. 10-2022-0109270 filed on Aug. 30, 2022 in the Korean Intellectual Property Office, the disclosure of which is incorporated herein by reference in its entirety.

BACKGROUND

The present inventive concept relates to an apparatus for automatically fastening a chemical coupler.

Conventionally, the fastening of connectors for chemical supply from a tank truck to an automatic clean quick coupler (ACQC) system is a manual operation performed by an operator.

However, since the operator directly fastens a chemical coupler to the ACQC system, there may be a risk of contamination with hazardous chemicals during a fastening procedure. Moreover, there may be a risk of an accident due to the inflammability, corrosiveness, and toxicity of these chemicals.

Accordingly, there is a need for an automated system that can reduce the risk of accidents during the fastening procedure.

SUMMARY

An aspect of the present inventive concept is to provide an apparatus for automatically fastening a chemical coupler, capable of performing fastening of connectors for chemical supply from a tank truck to an automatic clean quick coupler (ACQC) system without depending on an operator.

According to an aspect of the present inventive concept, an apparatus for automatically fastening a chemical coupler to a connector of an automatic clean quick coupler (ACQC) system, includes a main body, a multi-degree of freedom (DOF) robot arm supported by the main body, a gripper on the multi-DOF robot arm that is configured to grip the chemical coupler, a vision sensor on the multi-DOF robot arm, and a controller connected to the gripper, the multi-DOF robot arm, and the vision sensor. The controller uses information about an environment surrounding the multi-DOF robot arm, acquired by the vision sensor, to control an operation of the multi-DOF robot arm and an operation of the gripper. The gripper is connected to the multi-DOF robot arm via a conforming mechanism.

According to an aspect of the present inventive concept, an apparatus for automatically fastening a chemical coupler to a connector of an automatic clean quick coupler (ACQC) system includes a main body, a multi-degree of freedom (DOF) robot arm supported by the main body, a gripper connected to the multi-DOF robot arm, the gripper configured to grip the chemical coupler, a vision sensor on the multi-DOF robot arm, and a controller. The controller is connected to the gripper, the multi-DOF robot arm, and the vision sensor and uses information about an environment surrounding the multi-DOF robot arm, acquired by the vision sensor, to control an operation of the multi-DOF robot arm and an operation of the gripper. The multi-DOF robot arm includes a first transfer unit configured to move the multi-DOF robot arm along the main body in a first direction, a second transfer unit configured to move the multi- DOF robot arm in a second direction transverse to the first direction, and a third transfer unit configured to move the multi-DOF robot arm in a third direction transverse to the first and second directions. According to an aspect of the present inventive concept, and apparatus for automatically fastening a chemical coupler to a connector of an automatic clean quick coupler (ACQC) system includes a main body supported on a surface adjacent the ACQC system, a multi-degree of freedom (DOF) robot arm supported by the main body, a gripper connected to the multi-DOF robot arm via a conforming mechanism and configured to grip the chemical coupler, a vision sensor on the multi-DOF robot arm, and a controller connected to the gripper, the multi-DOF robot arm, and the vision sensor. The controller uses information regarding an environment surrounding the multi-DOF robot arm, acquired by the vision sensor, to control an operation of the multi-DOF robot arm and an operation of the gripper. The conforming mechanism includes at least one damper and at least one elastic member that are configured to mitigate force and torque applied to the conforming mechanism.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Hereinafter, preferred embodiments of the present inventive concept will be described with reference to the accompanying drawings.

Figure 1:
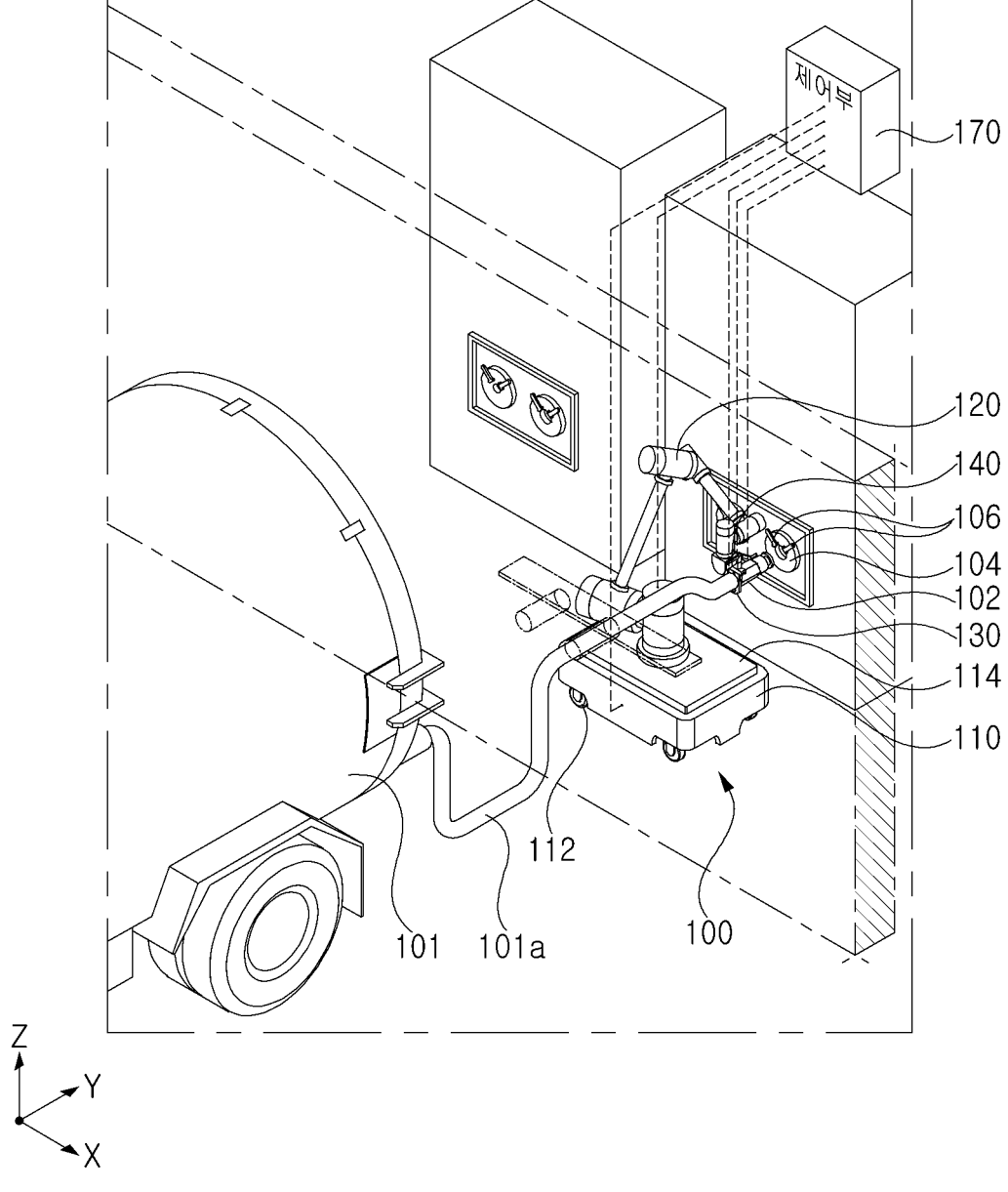
FIG. 1 is a perspective view illustrating an apparatus for automatically fastening a chemical coupler according to an embodiment.

FIG. 1 is a perspective view illustrating an apparatus for automatically fastening a chemical coupler according to an embodiment.

Referring to FIG. 1, an apparatus 100 for automatically fastening a chemical coupler, according to an embodiment, may include a main body 110, a multi-degree of freedom (DOF) robot arm 120, a gripper 130, a conforming mechanism 140, a vision sensor 150, and an opening/closing member 160.

The main body 110 may be an autonomous travelling (i.e., movable) robot capable of autonomous movement. As an example, the main body 110 may be provided with at least one wheel 112 for movement. The main body 110 may include a mount 114 for installation of the multi-DOF robot arm 120. In this manner, since the multi-DOF robot arm 120 is fixedly installed on the mount 114, the multi-DOF robot arm 120 may move together with the main body 110, when the main body 110 is moved. The main body 110 may be connected to a controller 170, and movement of the main body 110 may be controlled by the controller 170. FIG. 1 illustrates a case in which the controller 170 is located remote from the apparatus 100, but the present inventive concept is not limited thereto, and the controller 170 may be installed on the main body 110.

Figure 2:
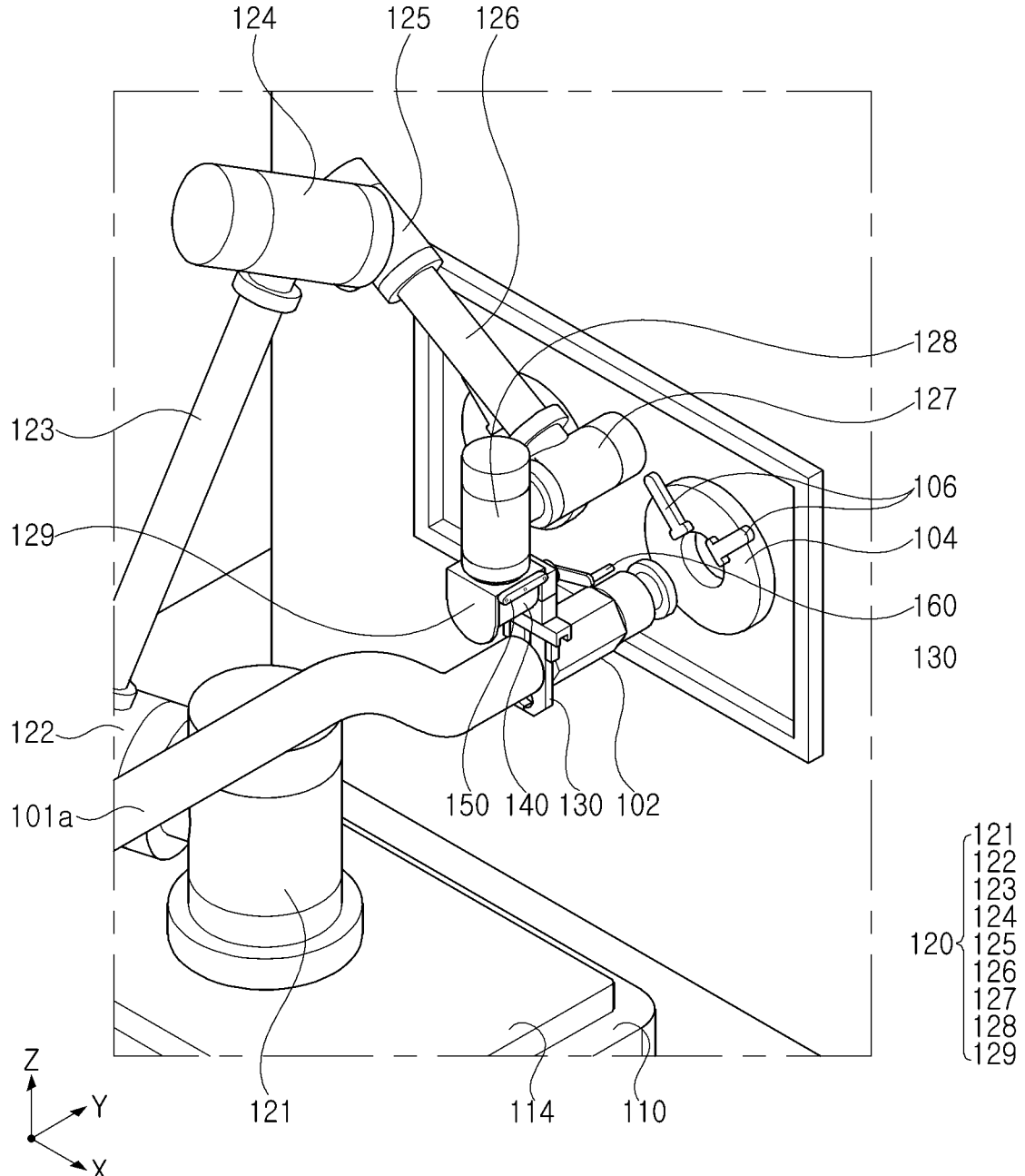
FIG. 2 is an illustrative diagram illustrating a multi-degree-of-freedom robot arm of an apparatus for automatically fastening a chemical coupler according to an embodiment.

The multi-DOF robot arm 120 may be fixedly installed on the main body 110, and may serve to transfer a chemical coupler 102 of a tank truck 101 to an automatic clean quick coupler (ACQC) system or from the ACQC system to the tank truck 101. As an example, as illustrated in more detail in FIG. 2, the multi-DOF robot arm 120 may include a first rotary driver 121 fixedly installed on the mount 114, a second rotary driver 122 connected to the first rotary driver 121, a first arm portion 123 connected to the second rotary driver 122, a third rotary driver 124 connected to an end of the first arm portion 123, a fourth rotary driver 125 connected rotatably to the third rotary driver 124, a second arm portion 126 connected to the fourth rotary driver 125, a fifth rotary driver 127 connected to an end of the second arm portion 126, a sixth rotary driver 128 connected to the fifth rotary driver 127, and a mounting portion 129 having one end connected to the sixth rotary driver 128 and the other end connected to the conforming mechanism 140. For example, the multi-DOF robot arm 120 may be a robot arm having 6 DOFs. In this case, briefly reviewing an operation of the multi-DOF robot arm 120, the second rotary driver 122 may rotate around the first rotary driver 121 by the first rotary driver 121. Also, the second rotary driver 122 may rotationally drive the first arm portion 123. Therefore, the first arm portion 123 may rotate around the second rotary driver 122. In addition, the fourth rotary driver 125 may rotate by the third rotary driver 124 disposed on an end of the first arm portion 123, and the fourth rotary driver 125 may rotate around the third rotary driver 124. And, the second arm portion 126 connected to the fourth rotary driver 125 may rotate around the fourth rotary driver 126. Therefore, the fifth rotary driver 127, the sixth rotary driver 128, and the mounting portion 129, connected to the second arm portion 126, may rotate around the second arm portion 126.

Moreover, the sixth rotary driver 128 may rotate by the fifth rotary driver 127, and the sixth rotary driver 128 may rotate around the fifth rotary driver 127. In addition, the mounting portion 129 may rotate by the sixth rotary driver 128, and thus the gripper 130 connected to the mounting portion 129 may rotate around the sixth rotary driver 128. The multi-DOF robot arm 120, described above, may be described as an example, and is not limited to the multi-DOF robot arm described above. For example, the multi-DOF robot arm 120 may be a robot arm having a plurality of arm portions and joints.

In addition, the multi-DOF robot arm 120 may be connected to the controller 170, and driving of the multi-DOF robot arm 120 may be controlled by the controller 170. As an example, the controller 170 may control driving of the multi-DOF robot arm 120 using image information acquired by the vision sensor 150.

Figure 3:
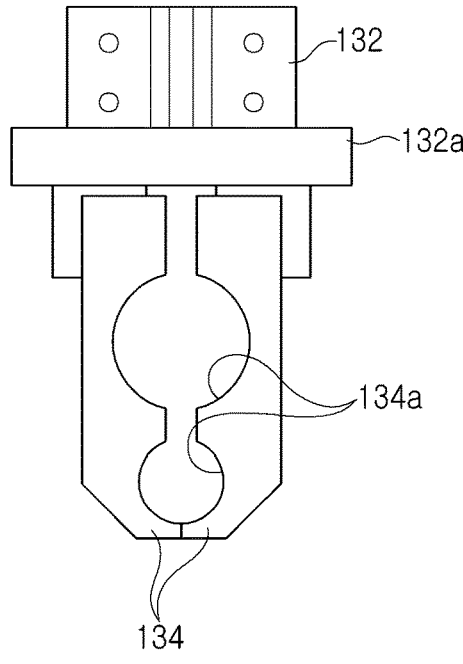
FIG. 3 is a front view illustrating a gripper of an apparatus for automatically fastening a chemical coupler according to an embodiment.
Figure 4:
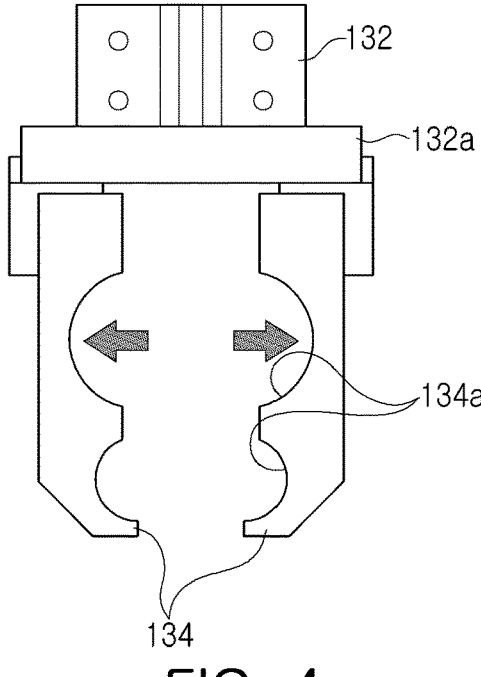
FIG. 4 is an illustrative diagram illustrating an operation of a gripper of an apparatus for automatically fastening a chemical coupler according to an embodiment.

The gripper 130 may be installed on the conforming mechanism 140, and may be connected to the mounting portion 129 of the multi-DOF robot arm 120. As an example, as illustrated in more detail in FIGS. 3 and 4, the gripper 130 may include a fixing portion 132 installed on the conforming mechanism 140 (see FIG. 2), and a pair of finger portions 134 installed to be slidably movable on the fixing portion 132. Further, a finger portion 134 may be slidably moved along a guide portion 132a disposed on an end of the fixing portion 132, to grip the chemical coupler 102. The finger portions 134 may include at least two grooves 134a having different sizes, to grip chemical couplers 102 having various sizes. Therefore, even when types and sizes of the chemical couplers 102 are different, the chemical couplers 102 may be easily gripped by the finger portion 134. In this manner, the finger portion 134 may be slidably moved to grip the chemical coupler 102 in the groove portions 134a or to detach the same from the groove portions 134a.

Figure 5:
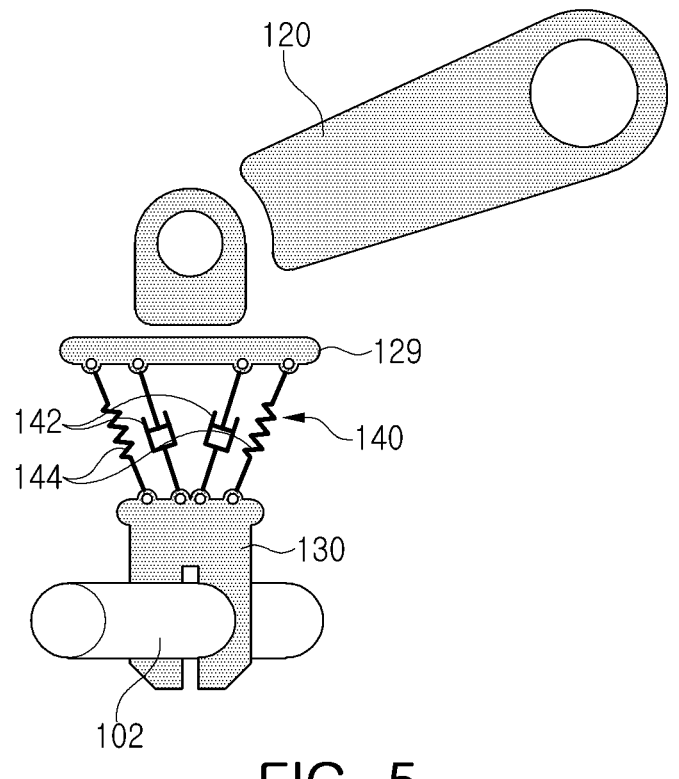
FIG. 5 is a configuration diagram illustrating a configuration of a conforming mechanism of an apparatus for automatically fastening a chemical coupler according to an embodiment.
Figure 6:
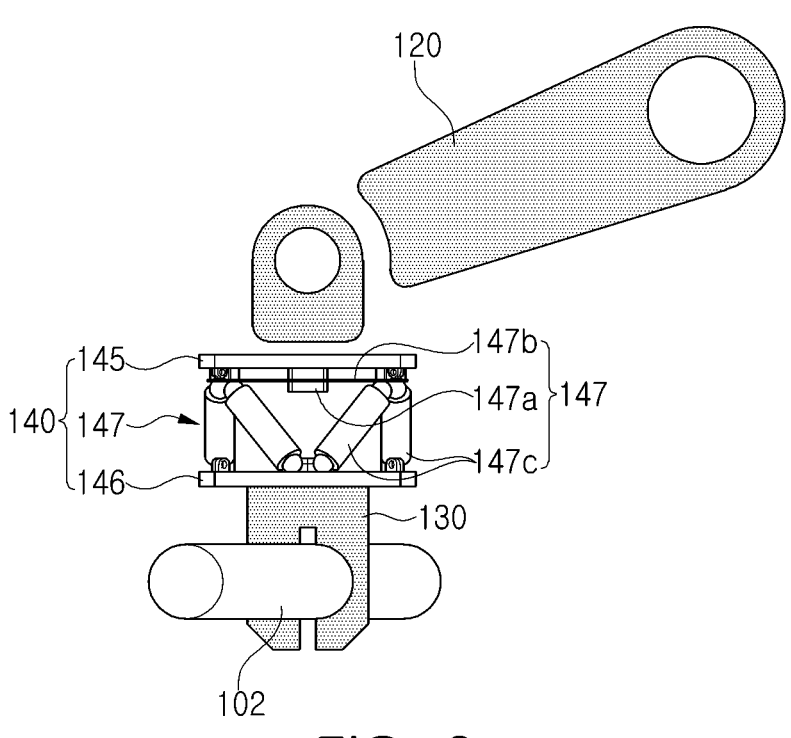
FIG. 6 is an illustrative diagram illustrating a configuration of a conforming mechanism of an apparatus for automatically fastening a chemical coupler according to an embodiment.

The conforming mechanism 140 may be connected between the gripper 130 and the mounting portion 129 of the multi-DOF robot arm 120. As an example, the conforming mechanism 140 may include an F/T sensor (not illustrated) capable of measuring force and torque, applied to the gripper 130. And, as illustrated in FIG. 5, the conforming mechanism 140 may include a plurality of dampers 142 and a plurality of elastic members 144 for mitigating force and torque, externally applied, and a damper 142 and an elastic member 144 may be alternately arranged, and may be arranged side by side, as illustrated. The conforming mechanism 140 may be also connected to the controller 170, and the controller 170 may control an operation of the gripper 130 using signals for force and torque, transmitted from the conforming mechanism 140. In this case, looking at a more specific embodiment of the conforming mechanism 140, as illustrated in FIG. 6, the conforming mechanism 140 may include a fixed platform 145 fixedly installed on the multi-DOF robot arm 120, a movable platform 146 disposed to be spaced apart from the fixed platform 145, and a conforming mechanism portion 147 connecting the fixed platform 145 and the movable platform 146. The conforming mechanism portion 147 may include a support block 147a, a leaf spring 147b connected to the support block 147a, an F/T sensor (not illustrated) for measuring a magnitude of deformation of the leaf spring 147b, and a support member 147c connecting the leaf spring 147b and the movable platform 146 to flowably support the movable platform 146.

Figure 7:
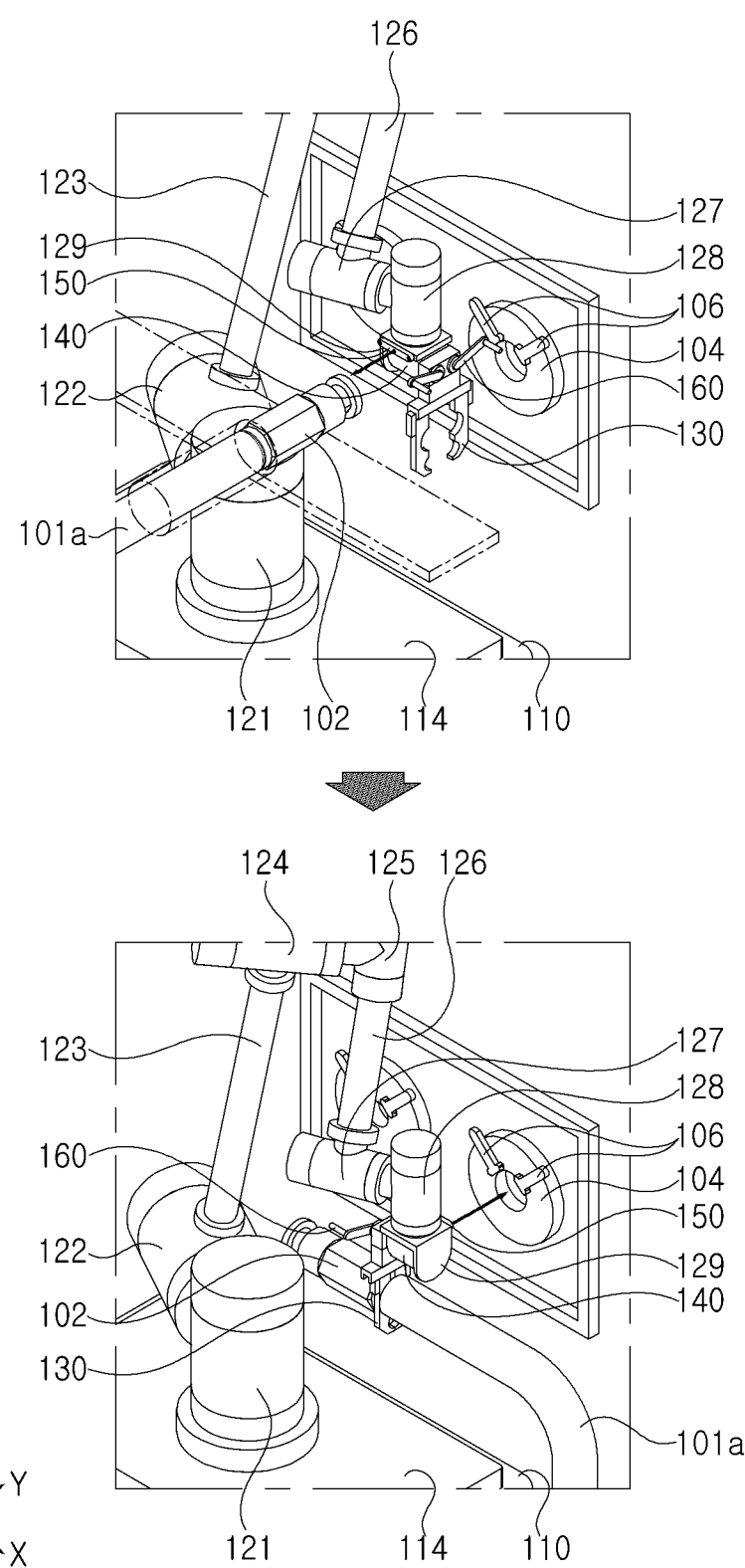
FIG. 7 is an illustrative diagram illustrating a vision sensor of an apparatus for automatically fastening a chemical coupler according to an embodiment.

As illustrated in more detail in FIG. 7, the vision sensor 150 may be fixedly installed on the mounting portion 129 of the multi-DOF robot arm 120, and may serve to transmit an image signal of an environment surrounding the multi-DOF robot arm 120 to the controller 170. The controller 170 may control movement of the main body 110, driving of the multi-DOF robot arm 120, and driving of the gripper 130, using a signal transmitted from the vision sensor 150. When the vision sensor 150 detects the chemical coupler 102 of the tank truck 101, the multi-DOF robot arm 120 may be driven, to move the gripper 130 to a position in which the chemical coupler 102 is gripped by the gripper 130. Thereafter, the gripper 130 may grip the chemical coupler 102, and the connector 104 of the ACQC system may be detected by the vision sensor 150. Thereafter, the multi-DOF robot arm 120 may be driven to connect the chemical coupler 102 to the connector 104 of the ACQC system.

Figure 8:
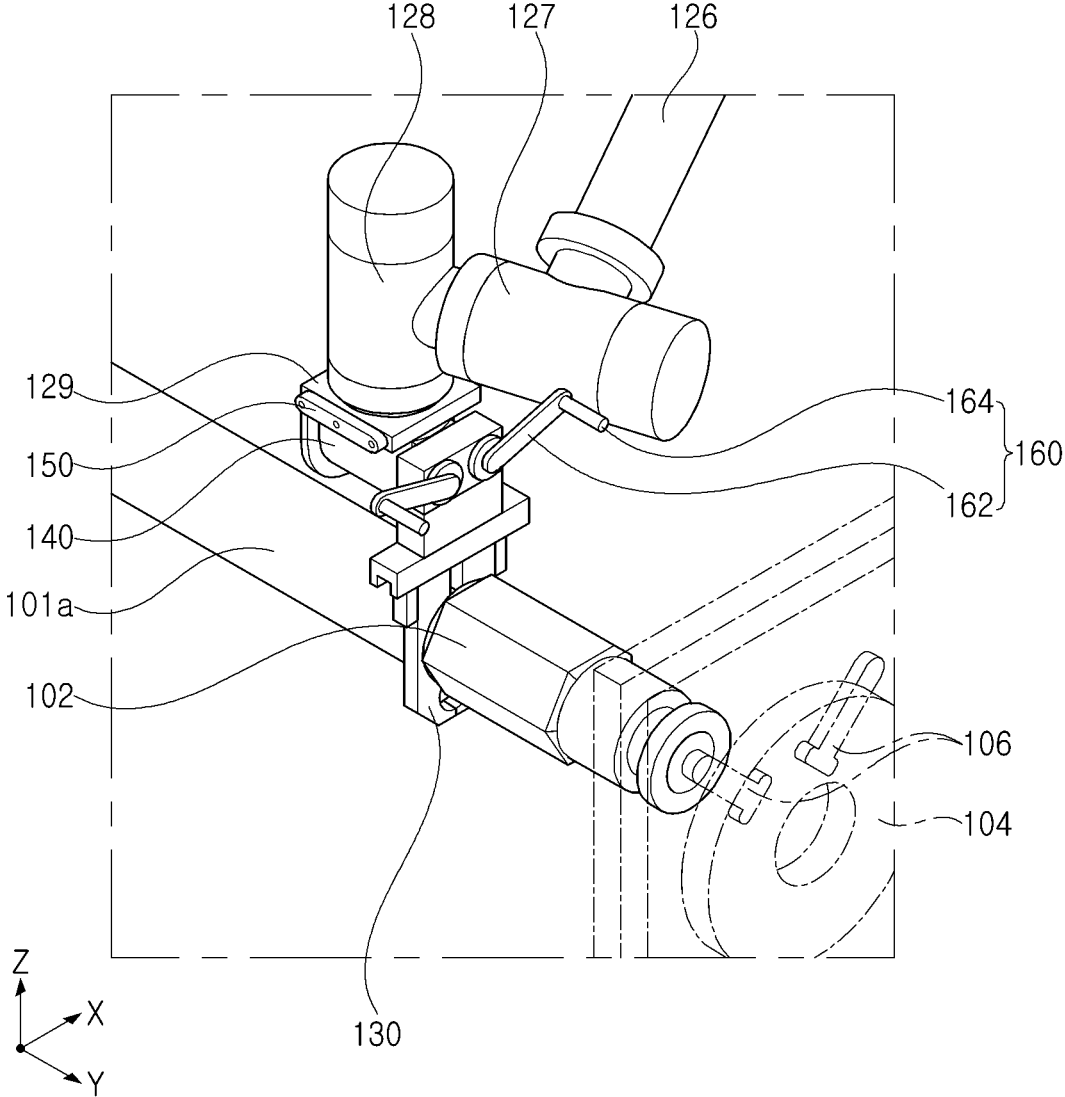
FIG. 8 is an illustrative view illustrating an opening/closing member of an apparatus for automatically fastening a chemical coupler according to an embodiment.

The opening/closing member 160 may be rotatably installed on the mounting portion 129 of the multi-DOF robot arm 120. As an example, a pair of opening/closing members 160 may be provided, and as illustrated in FIG. 8, a rotary bar 162 having a bar shape and rotating, and an extension bar 164 for pressing and rotating a manual lever 106 disposed on the connector 104 of the ACQC system. The opening/closing member 160 may serve to rotate the manual lever 106, before fastening or detaching the chemical coupler 102 to or from the connector 104 of the ACQC system by the multi-DOF robot arm 120, to fasten or detach the chemical coupler 102 to or from the connector 104 of the ACQC system. The opening/closing member 160 may be connected to the controller 170, such that the controller 170 controls an operation of the opening/closing member 160, based on an image acquired by the vision sensor 150, to rotate the manual lever 106.

In this case, operation control of an apparatus for automatically fastening a chemical coupler, by the controller 170, will be briefly described.

First, when the tank truck 101 is sensed by the vision sensor 150, the controller 170 may cause the main body 110 to move. Thereafter, the controller 170 may cause the vision sensor 150 to sense the chemical coupler 102 connected to a supply hose 101a of the tank truck 101. Thereafter, when the vision sensor 150 senses the chemical coupler 102, the controller 170 may drive the multi-DOF robot arm 120 to move the gripper 130 to a position in which the chemical coupler 102 is gripped by the gripper 130. Then, the controller 170 may control driving of the gripper 130 to grip the chemical coupler 102 by the gripper 130. In this case, the controller 170 may control an operation of the gripper 130 in consideration of force and torque, sensed by the conforming mechanism 140. Thereafter, the controller 170 may allow the vision sensor 150 to sense the connector 104 of the ACQC system. To this end, the controller 170 may cause the main body 110 to move such that the vision sensor 150 is positioned adjacent to the connector 104 of the ACQC system by the main body 110. And, the controller 170 may drive the multi-DOF robot arm 120 to a position in which the vision sensor 150 may detect the connector 104. Then, when the vision sensor 150 senses the connector 104 of the ACQC system, the controller 170 may drive the multi-DOF robot arm 120 to position the chemical coupler 102 to be adjacent to the connector 104 of the ACQC system. Thereafter, the controller 170 may drive the opening/closing member 160 to rotate the manual lever 106 provided in the connector 104, and may then control driving of the multi-DOF robot arm 120 and driving of the gripper 130 to connect the chemical coupler 102 to the connector 104.

And, when chemical supply to the ACQC system is completed, the opening/closing member 160, the multi-DOF robot arm 120, and the gripper 130 may be controlled in a reverse order of the above operations, to return the chemical coupler 102 to the tank truck 101.

As described above, fastening and detaching of the connector 104 of the chemical coupler 102 for chemical supply from the tank truck 101 to the ACQC system may be performed without requiring an operator.

Figure 9:
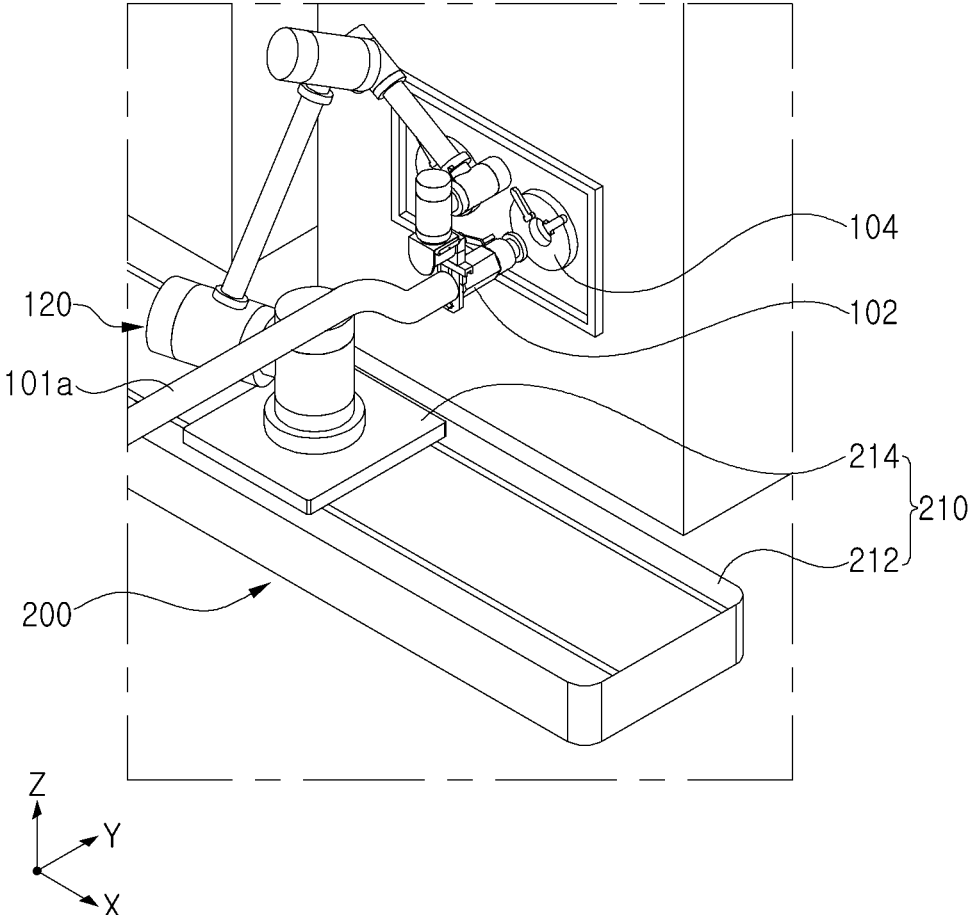
FIG. 9 is a perspective view illustrating an apparatus for automatically fastening a chemical coupler according to an embodiment.

FIG. 9 is a perspective view illustrating an apparatus for automatically fastening a chemical coupler according to an embodiment.

Referring to FIG. 9, in an apparatus 200 for automatically fastening a chemical coupler according to an embodiment, a main body 210 positioned in front of a connector 104 of an automatic clean quick coupler (ACQC) system may have installed thereon a multi-degree of freedom (DOF) robot arm 120. The main body 210 may include a guide member 212 disposed in an X-axis direction of FIG. 7, and a moving member or platform 214 movably installed on the guide member 212 in the X-axis direction.

In this manner, the multi-DOF robot arm 120 may be installed on the platform 214 that is movable along the guide member 212, to fasten and detach the chemical coupler 102 for chemical supply from the tank truck 101 (see FIG. 1) to the ACQC system, to and from the connector 104, while moving only in the X-axis direction.

Figure 10:
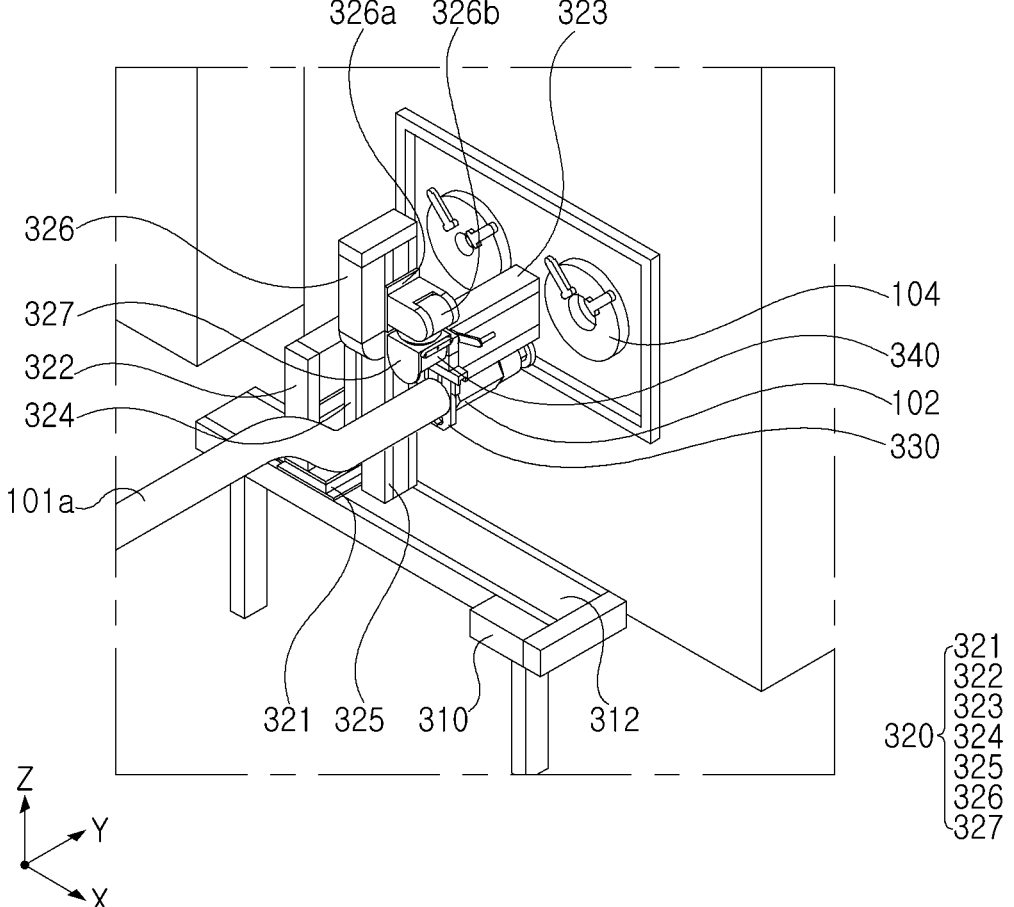
FIG. 10 is a perspective view illustrating an apparatus for automatically fastening a chemical coupler according to an embodiment.

FIG. 10 is a perspective view illustrating an apparatus for automatically fastening a chemical coupler according to an embodiment.

Referring to FIG. 10, an apparatus 300 for automatically fastening a chemical coupler according to an embodiment may include a multi-degree of freedom (DOF) robot arm 320 movably installed on a main body 310. The main body 310 may have a gantry shape fixedly installed on a bottom surface, to be disposed in front of a connector 104 of an automatic clean quick coupler (ACQC) system. A guide rail 312 for movement of the multi-DOF robot arm 320 in an X-axis direction of FIG. 10 may be provided on an upper surface of the main body 310. The multi-DOF robot arm 320 may be movably installed on the main body 310, and may serve to move a gripper 330 to a tank truck 301 and the connector 104 of the ACQC system. As an example, the multi-DOF robot arm 320 may include a first moving member or platform 321 movably installed on the guide rail 312. The platform 321 may move along the guide rail 312 of a fixed frame 310 in the X-axis direction. The multi-DOF robot arm 320 may be fixedly installed on the platform 321, and may include a first transfer unit 322 that is movable together with the platform 321. A component (not illustrated) for driving the platform 321 may be provided on the first transfer unit 322. As an example, the first transfer unit 322 may be fixedly installed on the platform 321, and the first transfer unit 322 may move the platform 321 along the guide rail 312, thereby allowing movement of multi-DOF robot arm 320 in the X-axis direction of FIG. 10. In addition, the first transfer unit 322 may be provided with a first guide member 323 extending in a direction facing the connector 104 of the ACQC system, for example, in a Y-axis direction of FIG. 10. As an example, the first guide member 323 may be moved between tank lorries 101 (see FIG. 1) in the connector 104 of the ACQC system. Also, the multi-DOF robot arm 320 may be provided with a second transfer unit 324 movably installed on the first guide member 323. A component (not illustrated) for driving the second transfer unit 324 to move along the first guide member 323 may be provided on the first transfer unit 322. Therefore, the second transfer unit 324 may be moved along the first guide member 323 in the Y-axis direction of FIG. 10. In addition, a second guide member 325 extending in a Z-axis direction of FIG. 10 may be provided in the second transfer unit 324. The second guide member 325 may serve to guide a third transfer unit 326 provided in the multi-DOF robot arm 320, to move along the Z-axis. A component (not illustrated) for driving the third transfer unit 326 to move along the second guide member 325 may be provided on the second transfer unit 324. The third transfer unit 326 may include a moving plate 326a moving along the second guide member 325, and a rotary driver 326b installed on the moving plate 326a. The rotary driver 326b may be provided with a mounting portion 327, and the mounting portion 327 may rotate around at least two axial directions by the rotary driver 326b. For example, the mounting portion 327 may rotate around the Y-axis and the Z-axis. A gripper 330 and a conforming mechanism 340 may be installed on the mounting portion 327.

In this manner, while the gripper 330 may be moved in a 3-axis direction and may rotate around 2-axes by the multi-DOF robot arm 320, fastening or detaching of a chemical coupler 102 for chemical supply from a tank truck 101 to the ACQC system to the connector 104 may be performed.

Figure 11:
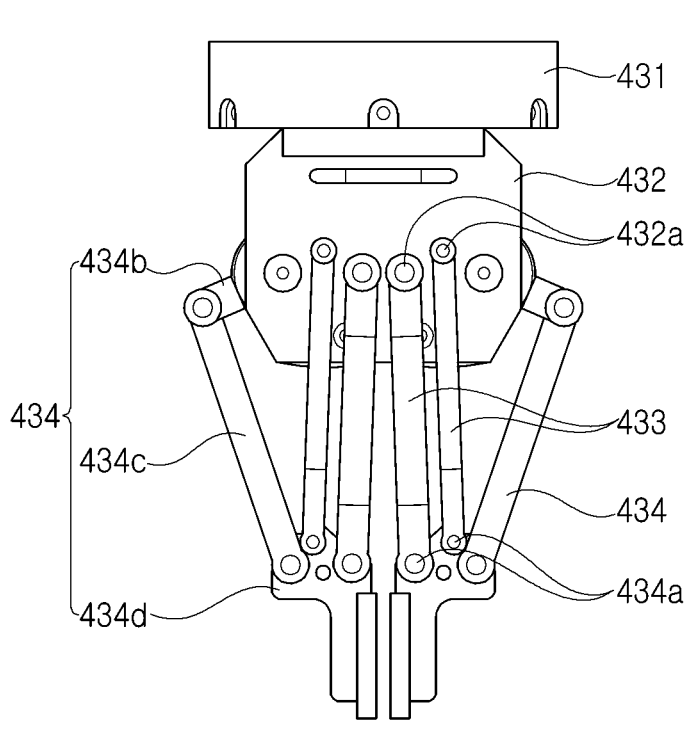
FIG. 11 is a front view illustrating a gripper of an apparatus for automatically fastening a chemical coupler according to an embodiment.
Figure 12:
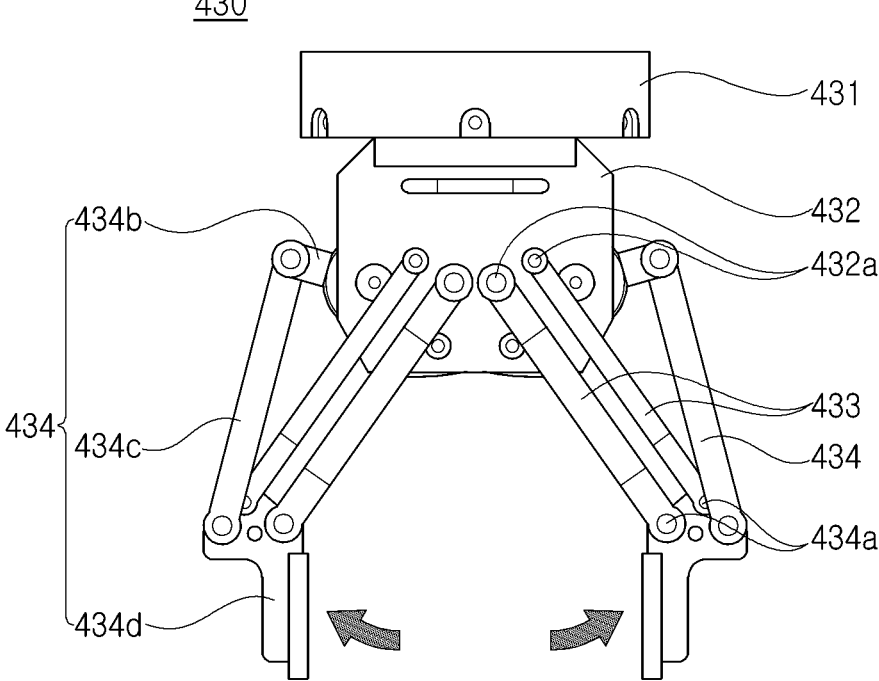
FIG. 12 is an illustrative diagram illustrating an operation of a gripper of an apparatus for automatically fastening a chemical coupler according to an embodiment.

FIG. 11 is a front view illustrating a gripper of an apparatus for automatically fastening a chemical coupler according to an embodiment, and FIG. 12 is an illustrative diagram illustrating an operation of a gripper of an apparatus for automatically fastening a chemical coupler according to an embodiment.

Referring to FIGS. 11 and 12, a gripper 430 may include a connector 431 connected to a conforming mechanism 140 (see FIG. 1), as described above, a power transmission portion 432 installed on one surface of the connector 431, a plurality of rotary bars 433 rotatably installed in the power transmission portion 432, and a finger portion 434 connected to and folded on ends of the plurality of rotary bars 433.

As an example, the power transmission portion 432 has an internal space, and a plurality of gears (not illustrated) may be installed to be engaged in the internal space of the power transmission portion 432 such that the plurality of rotary bars 433 and the finger portion 434 may rotate in conjunction with each other. As an example, the finger portion 434 may be folded while rotating the plurality of gears in forward and reverse directions. The plurality of rotary bars 433 may be rotatably connected to rotation shafts of some of the plurality of gears. In addition, in the plurality of rotary bars 433, one end thereof may be rotatably installed on a rotation shaft 432a for a rotary bar of the power transmission portion 432, and the other end thereof may be rotatably installed on a first rotation shaft 434a of the finger portion 434. As an example, the plurality of rotary bars 433 may serve to regulate rotation of the finger portion 434 such that the finger portion 434 is folded within a certain region. Finger portions 434 may be installed to form a pair, in which one is provided on each side of the power transmission portion 432. The finger portion 434 may include a first rotating member 434b, a second rotating member 434c rotatably installed on the first rotating member 434b, and a finger member 434d rotatably installed on an end of the second rotating member 434c. The other ends of the plurality of rotary bars 433 may be installed on the first rotation shaft 434a provided on the finger member 434d. Also, a chemical coupler 102 (see FIG. 1) may be gripped by the finger member 434d.

According to an embodiment of the present inventive concept, an apparatus for automatically fastening a chemical coupler, capable of performing fastening of connectors for chemical supply from a tank truck to an automatic clean quick coupler (ACQC) system without depending on an operator, may be provided.

Various beneficial effects of the present inventive concept are not limited to the above, and will be more easily understood in the process of describing specific embodiments of the present inventive concept.

While example embodiments have been illustrated and described above, it will be apparent to those skilled in the art that modifications and variations could be made without departing from the scope of the present inventive concept as defined by the appended claims.

What is claimed is:

1. An apparatus for automatically fastening a chemical coupler to a connector of an automatic clean quick coupler (ACQC) system, the apparatus comprising:
   a main body;
   a multi-degree of freedom (DOF) robot arm supported by the main body;
   a gripper connected to the multi-DOF robot arm, the gripper configured to grip the chemical coupler;
   a vision sensor on the multi-DOF robot arm; and
   a controller connected to the gripper, the multi-DOF robot arm, and the vision sensor,
   wherein the controller uses information about an environment surrounding the multi-DOF robot arm, acquired by the vision sensor, to control an operation of the multi-DOF robot arm and an operation of the gripper, and wherein the main body is an autonomous travelling robot and the controller is connected to the main body, to control travelling of the main body according to a signal from the vision sensor.

2. The apparatus of claim 1, wherein the multi-DOF robot arm comprises:
   a first rotary driver mounted on the main body;
   a second rotary driver connected to the first rotary driver;
   a first arm portion connected to the second rotary driver;
   a third rotary driver connected to an end of the first arm portion;
   a fourth rotary driver connected to the third rotary driver;
   a second arm portion connected to the fourth rotary driver;
   a fifth rotary driver connected to an end of the second arm portion;
   a sixth rotary driver connected to the fifth rotary driver; and
   a mounting portion rotatably connected to the sixth rotary driver.

3. The apparatus of claim 2, wherein the vision sensor is on the mounting portion.

4. The apparatus of claim 1, wherein the gripper comprises a pair of finger portions slidably movable relative to each other between open and closed positions.

5. The apparatus of claim 4, wherein each of the pair of finger portions comprises at least two grooves having different sizes.

6. The apparatus of claim 1, further comprising an opening/closing member on the multi-DOF robot arm adjacent to the gripper.

7. The apparatus of claim 6, wherein the opening/closing member is rotatably mounted on the multi-DOF robot arm, and configured to rotate a manual lever for opening or closing the connector of the ACQC system.

8. The apparatus of claim 1, wherein the main body comprises a guide member adjacent the connector of the ACQC system, and a platform movably secured to the guide member, and
   wherein the multi-DOF robot arm is mounted to the platform and moves along the guide member with the platform.

9. The apparatus of claim 1, wherein the main body is fixedly secured to a surface adjacent the connector of the ACQC system.

10. The apparatus of claim 1, wherein the gripper comprises a power transmission portion, a plurality of rotary bars rotatably secured to the power transmission portion, and a finger portion connected to and folded on ends of the plurality of rotary bars.

11. The apparatus of claim 10, wherein the finger portion comprises a first rotary member rotatably secured to the power transmission portion, a second rotary member rotatably secured to the first rotary member, and a finger member rotatably secured to an end of the second rotary member.

12. The apparatus of claim 1, wherein the multi-DOF robot arm has 6 degrees of freedom.

13. An apparatus for automatically fastening a chemical coupler to a connector of an automatic clean quick coupler (ACQC) system, the apparatus comprising:

a main body;
a multi-degree of freedom (DOF) robot arm supported by the main body, wherein the multi-DOF robot arm comprises:
a first transfer unit configured to move the multi-DOF robot arm in a first direction;
a second transfer unit configured to move the multi-DOF robot arm in a second direction transverse to the first direction; and
a third transfer unit configured to move the multi-DOF robot arm in a third direction transverse to the first and second directions;
a gripper connected to the multi-DOF robot arm, the gripper configured to grip the chemical coupler;
a vision sensor on the multi-DOF robot arm; and
a controller connected to the gripper, the multi-DOF robot arm, and the vision sensor, wherein the controller uses information about an environment surrounding the multi-DOF robot arm, acquired by the vision sensor, to control an operation of the multi-DOF robot arm and an operation of the gripper.

14. The apparatus of claim 13, wherein the main body is fixedly secured to a surface adjacent the ACQC system.

15. The apparatus of claim 13, wherein the multi-DOF robot arm has 6 degrees of freedom.

16. The apparatus of claim 13, wherein the gripper comprises a pair of finger portions slidably movable between open and closed positions.

17. The apparatus of claim 16, wherein each of the pair of finger portions comprises at least two grooves having different sizes.

18. An apparatus for automatically fastening a chemical coupler to a connector of an automatic clean quick coupler (ACQC) system, the apparatus comprising:

a main body located adjacent the ACQC system;
a multi-degree of freedom (DOF) robot arm supported by the main body;
a gripper connected to the multi-DOF robot arm via a conforming mechanism, the gripper configured to grip the chemical coupler, wherein the conforming mechanism comprises at least one damper and at least one elastic member that are configured to mitigate force and torque applied to the conforming mechanism;
a vision sensor on the multi-DOF robot arm; and
a controller connected to the gripper, the multi-DOF robot arm, and the vision sensor, wherein the controller uses information regarding an environment surrounding the multi-DOF robot arm, acquired by the vision sensor, to control an operation of the multi-DOF robot arm and an operation of the gripper.

* * * * *